(12) United States Patent
Jang

(10) Patent No.: US 11,887,065 B2
(45) Date of Patent: Jan. 30, 2024

(54) INTELLIGENT CREDIT CARD PAYMENT SYSTEM AND PAYMENT PROCESSING METHOD

(71) Applicant: LORDSYSTEM CO., LTD., Seoul (KR)

(72) Inventor: Yang Ho Jang, Yeoncheon-gun (KR)

(73) Assignee: LORDSYSTEM CO., LTD., Seoul (KR)

(*) Notice: Subject to any disclaimer, the term of this patent is extended or adjusted under 35 U.S.C. 154(b) by 219 days.

(21) Appl. No.: 17/047,366

(22) PCT Filed: Apr. 13, 2018

(86) PCT No.: PCT/KR2018/004320
§ 371 (c)(1),
(2) Date: Oct. 13, 2020

(87) PCT Pub. No.: WO2019/198847
PCT Pub. Date: Oct. 17, 2019

(65) Prior Publication Data
US 2021/0117934 A1 Apr. 22, 2021

(51) Int. Cl.
*G06Q 20/02* (2012.01)
*G06Q 20/40* (2012.01)
(Continued)

(52) U.S. Cl.
CPC ............ *G06Q 20/02* (2013.01); *G06Q 20/202* (2013.01); *G06Q 20/204* (2013.01);
(Continued)

(58) Field of Classification Search
CPC .... G06Q 20/02; G06Q 20/202; G06Q 20/204; G06Q 20/209; G06Q 20/341;
(Continued)

(56) References Cited

U.S. PATENT DOCUMENTS

2016/0171485 A1* 6/2016 Koike ................... G07F 7/127
705/41

FOREIGN PATENT DOCUMENTS

CN 107292598 A * 10/2017
EP 3 232 391 A1 10/2017
(Continued)

OTHER PUBLICATIONS

19. "A guide to EMV chip technology", version 2.0, Nov. 2014, EMVCo LLC (Year: 2014).*
(Continued)

*Primary Examiner* — Duan Zhang
(74) *Attorney, Agent, or Firm* — Maschoff Brennan

(57) ABSTRACT

An intelligent credit card payment system and payment processing method may be implemented to perform duplex payment through VAN or PG linking so that payment can be stably performed, in consideration of the problem that credit card payment is no longer available due to reaching the monthly limit set by a card company for a member store, or for another reason due to the member store. To this end, an intelligent terminal, a VAN network, and a PG network are included, so that: according to a configuration for an intelligent terminal, VAN approval information is converted into PG approval information, and thus payment processing according to VAN linking is changed to payment processing according to PG linking; or PG approval information is converted into VAN approval information, and thus payment processing according to PG linking is changed to payment processing according to VAN linking.

2 Claims, 8 Drawing Sheets

(51) Int. Cl.
*G06Q 20/20* (2012.01)
*G06Q 20/34* (2012.01)
*G06Q 20/42* (2012.01)
*G06Q 40/02* (2023.01)
*H04L 9/40* (2022.01)

(52) U.S. Cl.
CPC ......... *G06Q 20/209* (2013.01); *G06Q 20/341* (2013.01); *G06Q 20/401* (2013.01); *G06Q 20/407* (2013.01); *G06Q 20/42* (2013.01); *G06Q 40/02* (2013.01); *H04L 63/0428* (2013.01); *G06Q 2220/00* (2013.01)

(58) Field of Classification Search
CPC .... G06Q 20/401; G06Q 20/407; G06Q 20/42; G06Q 40/02; G06Q 2220/00; G06Q 20/24; G06Q 20/405; H04L 63/0428
See application file for complete search history.

(56) References Cited

FOREIGN PATENT DOCUMENTS

| | | | | |
|---|---|---|---|---|
| EP | 3232391 | A1 * | 10/2017 | ........... G06Q 20/204 |
| KE | 10-2015-0029664 | | 3/2015 | |
| KR | 10-2006-0108358 | | 10/2006 | |
| KR | 10-2013-0102792 | A | 9/2013 | |
| KR | 101449644 | B1 * | 10/2014 | |
| KR | 20150029664 | A * | 3/2015 | ........... G06Q 20/204 |
| KR | 10-2015-0134928 | A | 12/2015 | |
| KR | 10-2016-0002432 | A | 1/2016 | |
| KR | 101708697 | B1 * | 2/2017 | |
| KR | 10-1726243 | B1 | 4/2017 | |
| KR | 10-1828742 | B1 | 3/2018 | |

OTHER PUBLICATIONS

[Infini Sotry] Introducing the integrated payment application "INNOPAY" for sellers Retrieved from https://blog.naver.com/infinisoft_blog/220998740758 on May 5, 2017.
"A Guide to EMV Chip Technology," EMVCo, LLC, Version 2.0, pp. 1-36 (Nov. 2014).

* cited by examiner

FIG. 8

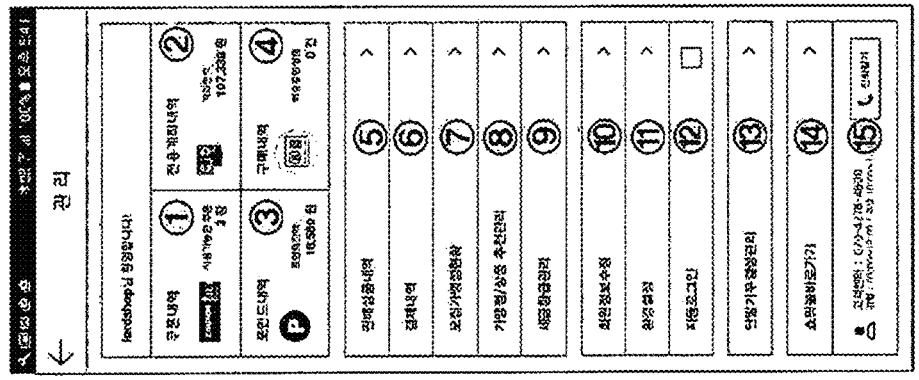

| Category | Content |
|---|---|
| 1 Coupon management | Coupon details management, gift, payment, and refund |
| 2 Exclusive account | Exclusive account deposit/withdrawal details management, gifts and |
| 3 Points management | Points details management, gift, and recharge |
| 4 Affiliated store purchase details management | Shopping mall purchase details management, purchased products view, cancellation, receipt printing, and delivery details |
| 5 Sales details management | Sales details management of affiliated store, sales products view, cancellation, and receipt |
| 6 Coupon payment details management | Affiliated store coupon payment details are managed |
| 7 Status of affiliated stores | Status of recruiting affiliated stores and status of revenue are managed |
| 8 Affiliated store recommendation/product recommendation management | Affiliated store/product recommendation details management, affiliated store recommendation, and product recommendation |
| 9 Tax refund management | Foreigner tax refund details management, refund cancellation, and receipt |
| 10 Edit member information | Member information is edited. |
| 11 Environment setting management | Environment for using the POS system is set up. |
| 12 Automatic login | This is an option to automatically log in to the POS system. |
| 13 Terminal integrity management | POS terminal security check, security key down, and integrity check |
| 14 Go to shopping mall exclusive for affiliated store | This is directed to the shopping mall exclusive for affiliated stores. |
| 15 Call customer service | This is a function to make a call to the customer center. |

INTELLIGENT CREDIT CARD PAYMENT SYSTEM AND PAYMENT PROCESSING METHOD

TECHNICAL FIELD

The present invention relates to an intelligent credit card payment system and a payment processing method, and more particularly, to an intelligent credit card payment system and a payment processing method, which are implemented to perform duplex payment through VAN or PG linkage in consideration of the problem that credit card payment is no longer available due to reaching the monthly limit set by a card company for a member store, so that payment can be stably performed.

BACKGROUND ART

In general, as widely known, when a consumer holding a credit card purchases goods or settles a payment online or offline, an offline payment is performed through a value added network (VAN) linkage, and an online payment is performed through a payment gateway (PG) linkage.

The above-described payment refers to a payment system that is currently and normally applied as known by Korean Unexamined Patent Publication No. 10-2006-0108358, Korean Unexamined Patent Publication No. 10-2015-0029664, etc.

In addition, when a credit card payment is approved by a credit card company through VAN linkage or PG linkage, an affiliated store provides a credit card receipt to a consumer, and accordingly, a selling act is completed. The approved sales revenue is deposited into the bank, which opens an account of the affiliated store, through a predetermined process, and the affiliated store may encash and use the deposited money.

Meanwhile, credit card companies usually set a credit limit on a monthly basis for allowing affiliated stores based on business types of affiliated stores to use credit card payment in order to prevent various accidents caused by credit payment.

In general, the credit limit of affiliated stores is set by statistics of the card companies that predict a predetermined sales amount according to the business type. Actually, an increase of the limit for the affiliated store may be easily approved upon the request by the affiliated store unless there is a special reason.

However, when viewed from an aspect of the affiliated store, the monthly sales may vary depending on seasons. When the payment cannot be approved due to the over-credit limit set by the card company with respect to the affiliated store upon card payment of a consumer, the over-credit limit leads to the loss of sales of the affiliated store.

Meanwhile, when a payment proceeds online, a PG company as a representative makes a contract with a credit card company, executes a credit card payment and settlement as an agent, and receives a commission from sub-shopping malls (affiliated stores). Substantially, the sub-shopping malls that use the PG linkage online may not have a limit such as a limit on affiliate stores offline because the PG company provides an electronic payment service as an agency.

However, since each individual affiliated store offline is directly connected to the credit card company by using VAN linkage through each terminal, the credit card payment limit of each affiliated store may exert a direct restriction on sales.

Accordingly, there is a demand for a system to solve the problem that the credit card payment cannot be approved due to the over-credit limit of the affiliated store or other special reasons upon credit card payment proceeding offline, and to enable a consumer's credit card payment to be stably performed without interruption due to a problem on the affiliated store within the affiliated store.

DETAILED DESCRIPTION OF THE INVENTION

Technical Problem

The present invention is disclosed to solve the above-mentioned problems, and an object of the present invention is to provide an intelligent credit card payment system and a payment processing method, which is configured such that a credit card payment of a purchaser stably proceeds without being interrupted due to the over-credit limit of the affiliated store or other reasons of the affiliated store upon offline card payment through a terminal

Technical Solution

In order to achieve the above-mentioned object, the intelligent credit card payment system according to the present invention includes: an intelligent terminal of an affiliated store for entering transaction information including card information, product price, and payment information according to an IC credit card payment of a purchaser, and automatically setting and performing a payment processing network through VAN linkage or PG linkage; a VAN network for encrypting and processing the transaction information inputted according to the VAN linkage of the intelligent terminal into VAN approval information; and a PG network encrypting and processing the transaction information inputted according to the PG linkage of the intelligent terminal into PG approval information.

Thus, according to settings of the intelligent terminal, the VAN approval information is converted to the PG approval information so that a payment processing subject to the VAN linkage is switched to a payment processing subject to the PG linkage, or the PG approval information is converted to the VAN approval information so that a payment processing subject to the PG linkage is switched to a payment processing subject to the VAN linkage.

The intelligent terminal include at least one of: a card reader unit for reading the credit card of the purchaser to input the transaction information; a control unit having a credit card payment linkage routing module for selecting a payment network subject to the VAN linkage or the PG linkage according to the inputted transaction information and the settings, a VAN linkage approval information generation module for encrypting and generating approval information when VAN is linked, a PG linkage approval information generation module for encrypting and generating approval information when PG is linked, and a response message analysis approval routing module for determining whether to set up PG linkage by analyzing a rejection reason when the VAN linkage approval information is rejected; a communication processing unit having a VAN linkage approval module, a PG linkage approval module, and a communication module for storing completed transaction information in a DB server through a communication network; and a memory unit having a last previous credit card approval transaction storage module in which transaction information before transaction completion approval is encrypted and temporarily stored.

The intelligent terminal further includes a screen output unit for outputting data including the transaction information on a display, and a print output unit for outputting print information including a transaction-completed receipt through a printing device.

Meanwhile, the payment processing method using the intelligent credit card payment system will be implemented as follows.

The payment processing method includes: step S1 of checking transaction information including card information, product price, and payment information from an IC credit card of a purchaser, and selecting a VAN linkage or a PG linkage according to a setting; step S2 of generating VAN approval information according to the VAN linkage in step S1 and requesting an approval using a VAN network; step S3 of checking whether the approval is normally performed or rejected based on the approval request in step S2; step S4 of storing the transaction information and outputting a receipt when the result in step S3 is the normal approval, thereby completing the transaction; step S5 of analyzing an error code when the result in step S3 is the rejected approval; step S6 of displaying that a payment is switched to be processed through the PG linkage when an error is confirmed as being related to the affiliate store according to step S5, and converting the VAN approval information into PG approval information and requesting an approval by using a PG network; step S7 of checking whether the approval is normally performed or rejected based on the approval request in step S6 is a normal approval or rejected approval; step S8 of storing the transaction information and outputting a receipt when the result in step S7 is the normal approval, thereby completing the transaction; step S8 of determining that the result is an error related to the purchaser and terminating the transaction when the result in step S7 is the rejected approval.

In addition, step S4 and step S8 includes step SS1 of confirming a final purchase intention of the purchaser just before completing the transaction.

In step SS1, VAN approval information or PG approval information according to a cancellation request is generated to request a cancellation approval by using the VAN network or the PG network, and the transaction information canceled upon the normal approval is stored in the server according to the result of the cancellation approval request, and temporarily stored transaction information is deleted.

Meanwhile, step S4 and step S8 includes: transaction cancellation step S9 subject to a purchase cancellation request by the purchaser after completing the transaction.

The transaction cancellation step S9 includes: process S91 of checking cancellation information including card information, product price, and payment information from the IC credit card of the purchaser; process S92 of comparing and checking the cancellation information in process S91 with the transaction information stored in the server 200 and confirming whether the payment is processed through the VAN linkage or the PG linkage; and A step in which VAN approval information or PG approval information subject to a cancellation request is generated according to the payment processing confirmed in S92 process to request a cancellation approval by using the VAN network or the PG network, and the transaction information canceled according to the result of the cancellation approval request is stored in the server, and the temporarily stored transaction information is deleted.

Advantageous Effects

According to the intelligent credit card payment system and the payment processing method of the present invention as described above, first, the credit card payment is performed by automatically routing the VAN linkage and the PG linkage as necessary upon payment using the IC credit card, so that the security and the convenience can be improved.

Second, the affiliated store is not limited by the affiliated credit limit due to the duplex payment structure through the VAN or PG linkage, so that the payment can stably proceed without being interrupted.

DESCRIPTION OF THE DRAWINGS

FIG. 8 is a diagram showing one embodiment of an administrator screen displayed on the intelligent terminal according to FIG. 2.

BEST MODE

Figure 1:
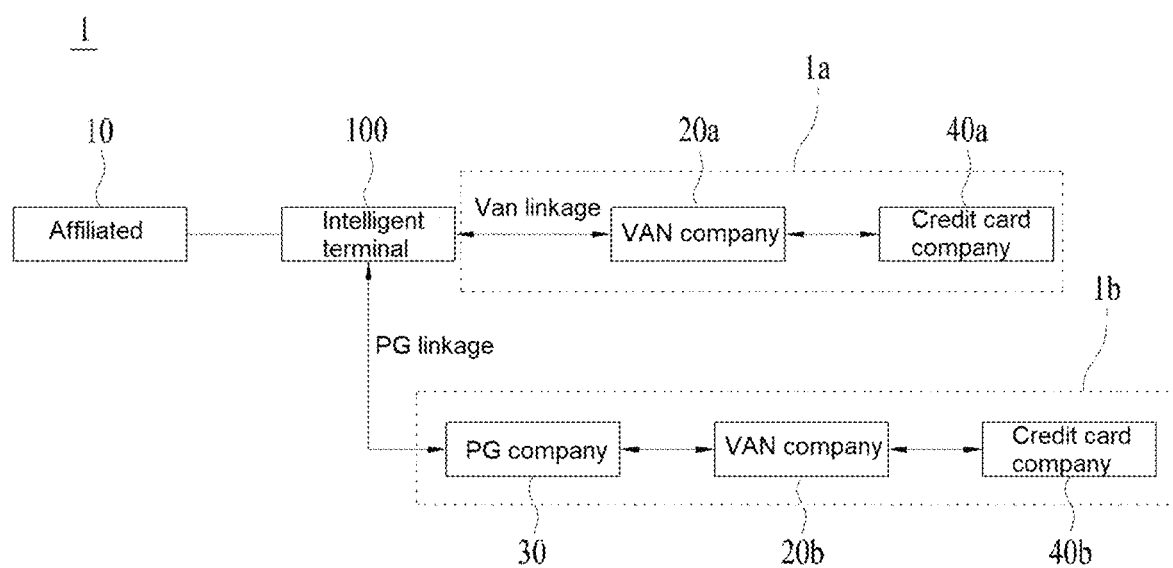
FIG. 1 is a view showing an intelligent credit card payment system according to the present invention.

As a best mode, the present invention proposes an intelligent credit card payment system including: an intelligent terminal 100 of an affiliated store 10 for inputting transaction information including card information, product price, and payment information according to an IC credit card payment of a purchaser, and automatically setting and performing a payment processing network through VAN linkage or PG linkage; a VAN network 1a for encrypting and processing the transaction information inputted according to the VAN linkage of the intelligent terminal 100 into VAN approval information; and a PG network 1b encrypting and processing the transaction information inputted according to the PG linkage of the intelligent terminal 100 into PG approval information.

According to the intelligent terminal 100, a duplex payment structure is configured in which, when an approval is rejected due to an error relevant to the affiliated store during processing a payment subject to the VAN linkage, the intelligent terminal is automatically routed and displays that a payment is switched to be processed through the PG linkage, the VAN payment information is converted to the PG payment information, and the payment processing subject to the VAN linkage is switched to the payment processing subject to the PG linkage.

In an affiliated store product sales screen and a credit card cancellation screen outputted on a display 101 of the intelligent terminal 100, a purchaser selects whether the payment is a payment through the VAN linkage, a payment through the PG linkage, or a combined payment processed by selectively switching the VAN linkage or the PG linkage.

BEST MODE FOR EMBODIMENT OF THE PRESENT INVENTION

Hereinafter, exemplary embodiments of the intelligent credit card payment system and the payment processing method according to the present invention will be described in detail with reference to the accompanying drawings.

For describing the present invention, the detailed description of relevant known functions or configurations will be omitted not to make the subject matter of the present invention unclear.

First, according to the intelligent credit card payment system and the payment processing method according to the present invention the purchaser's IC credit card payment processing network may be automatically switched to VAN linkage or PG linkage payment processing depending on the optional circumstances of the affiliated store 10, so that the duplex payment structure can enable the affiliated stores to make stable payments without being limited by the credit limit of the affiliated store.

To this end, the intelligent credit card payment system 1 according to the present invention mainly includes the intelligent terminal 100 provided in the affiliated store 10, a VAN network 1a, and a PG network 1b.

The intelligent terminal 100 enters transaction information including card information, product price, and payment information according to an IC credit card payment of a purchaser, and automatically sets and performs a payment processing network through VAN linkage or PG linkage.

In addition, the VAN network 1a encrypts and processes the transaction information inputted according to the VAN linkage of the intelligent terminal 100 into VAN approval information, in which the VAN company 20a and the credit card company 40a are connected through the VAN network 1a.

The payment processing through the VAN network (1a) is subject to the normal processing process, and the detailed description will be omitted not to make the subject matter of the present invention unclear.

In addition, the PG network 1b encrypts and processes the transaction information inputted according to the PG linkage of the intelligent terminal 100 into PG approval information, in which a PG company, a VAN company, and a credit card company are connected to each other through the PG network 1b.

According to the intelligent credit card payment system 1 configured as described above, according to the intelligent terminal 100, the VAN approval information is converted to the PG approval information so that a payment processing subject to the VAN linkage is switched to a payment processing subject to the PG linkage, or the PG approval information is converted to the VAN approval information so that a payment processing subject to the PG linkage is switched to a payment processing subject to the VAN linkage.

The intelligent terminal 100 may be a POS terminal inside the affiliated store 10 in which a unique number is registered and approved by the VAN company. In addition, the intelligent terminal 100 also may be a mobile device such as a smart phone capable of serving as the POS terminal after a separate application is installed.

Figure 2:
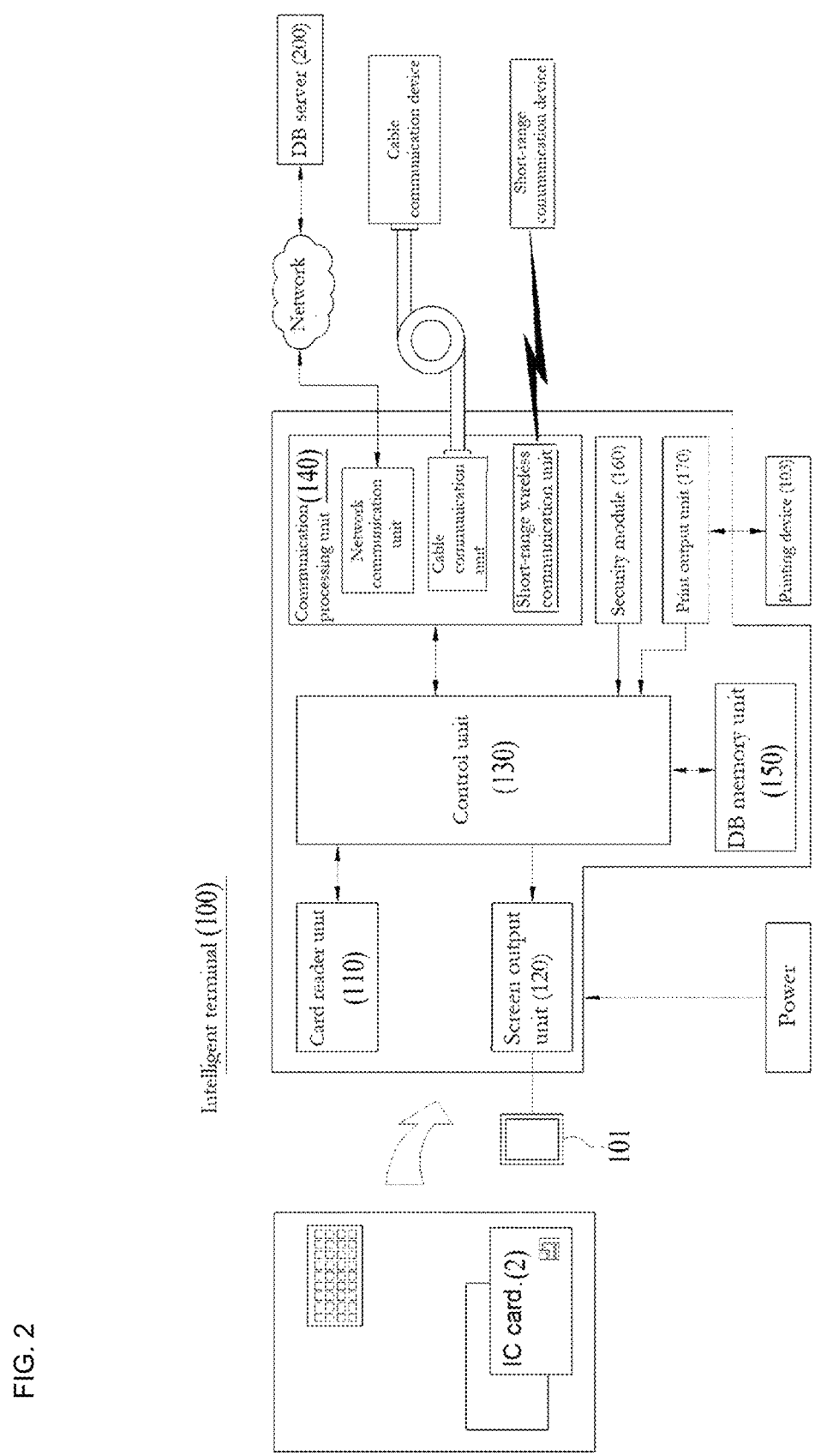
FIG. 2 is a block diagram showing an intelligent terminal according to FIG. 1.
Figure 4:
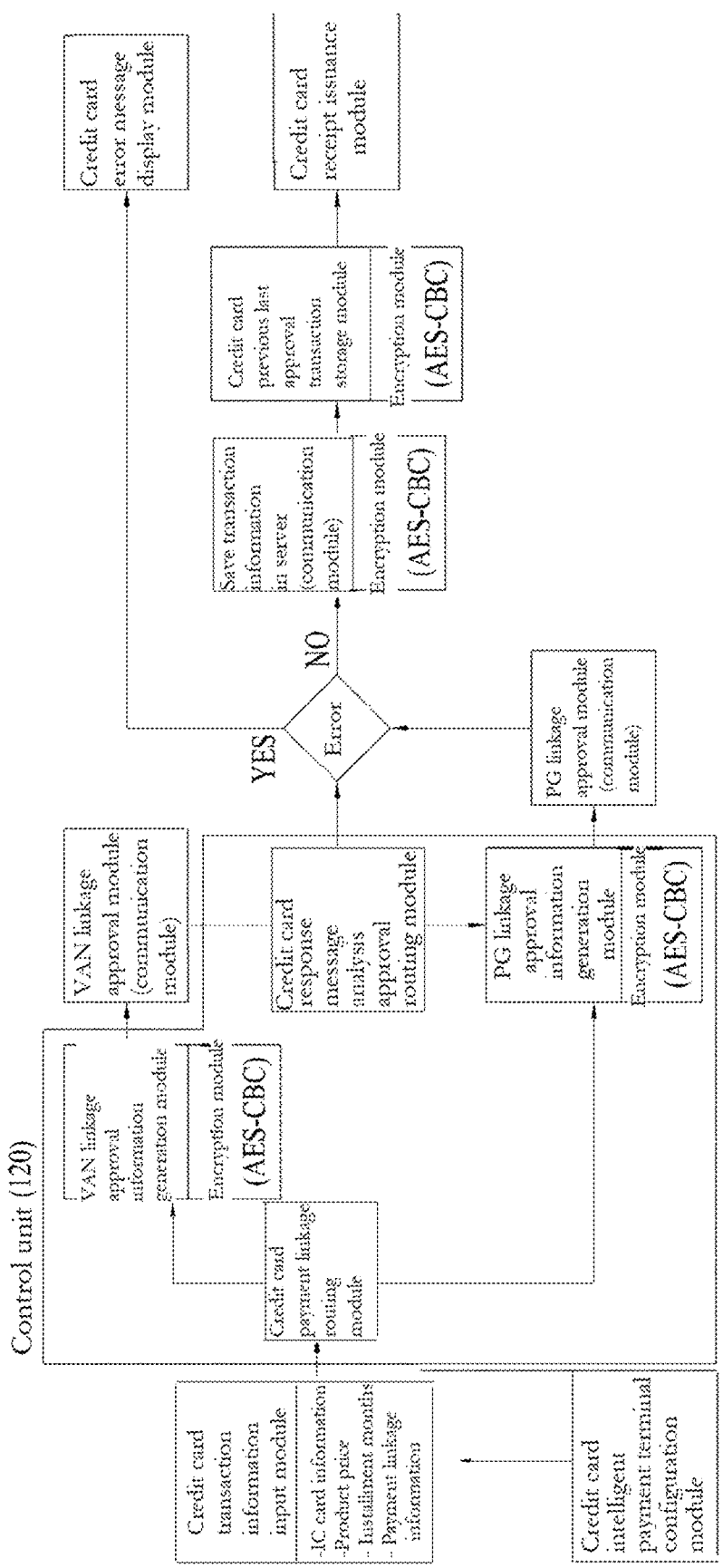
FIG. 4 is a block diagram showing a processing process of the intelligent credit card payment system according to the present invention.

Meanwhile, referring to FIGS. 2 and 4, the intelligent terminal 100 includes at least one of: a card reader unit 110 for reading the credit card 2 of the purchaser to input the transaction information; a control unit 130 having a credit card payment linkage routing module for selecting a payment network subject to the VAN linkage or the PG linkage according to the inputted transaction information and the settings, a VAN linkage approval information generation module for encrypting and generating approval information when VAN is linked, a PG linkage approval information generation module for encrypting and generating approval information when PG is linked, and a response message analysis approval routing module for determining whether to set up PG linkage by analyzing a rejection reason when the VAN linkage approval information is rejected; a communication processing unit 140 having a VAN linkage approval module, a PG linkage approval module, and a communication module for storing completed transaction information in a DB server 200 through a communication network; and a memory unit 150 having a last previous credit card approval transaction storage module in which transaction information before transaction completion approval is encrypted and temporarily stored According to the above configuration, the credit card payment processing is selected through the control unit 130 and displayed to enable an owner of the affiliated store or the purchaser to confirm.

In addition, the intelligent terminal 100 further includes a screen output unit 120 for outputting data including the transaction information on a display, and a print output unit 160 for outputting print information including a transaction-completed receipt through a printing device 103.

Figure 3:
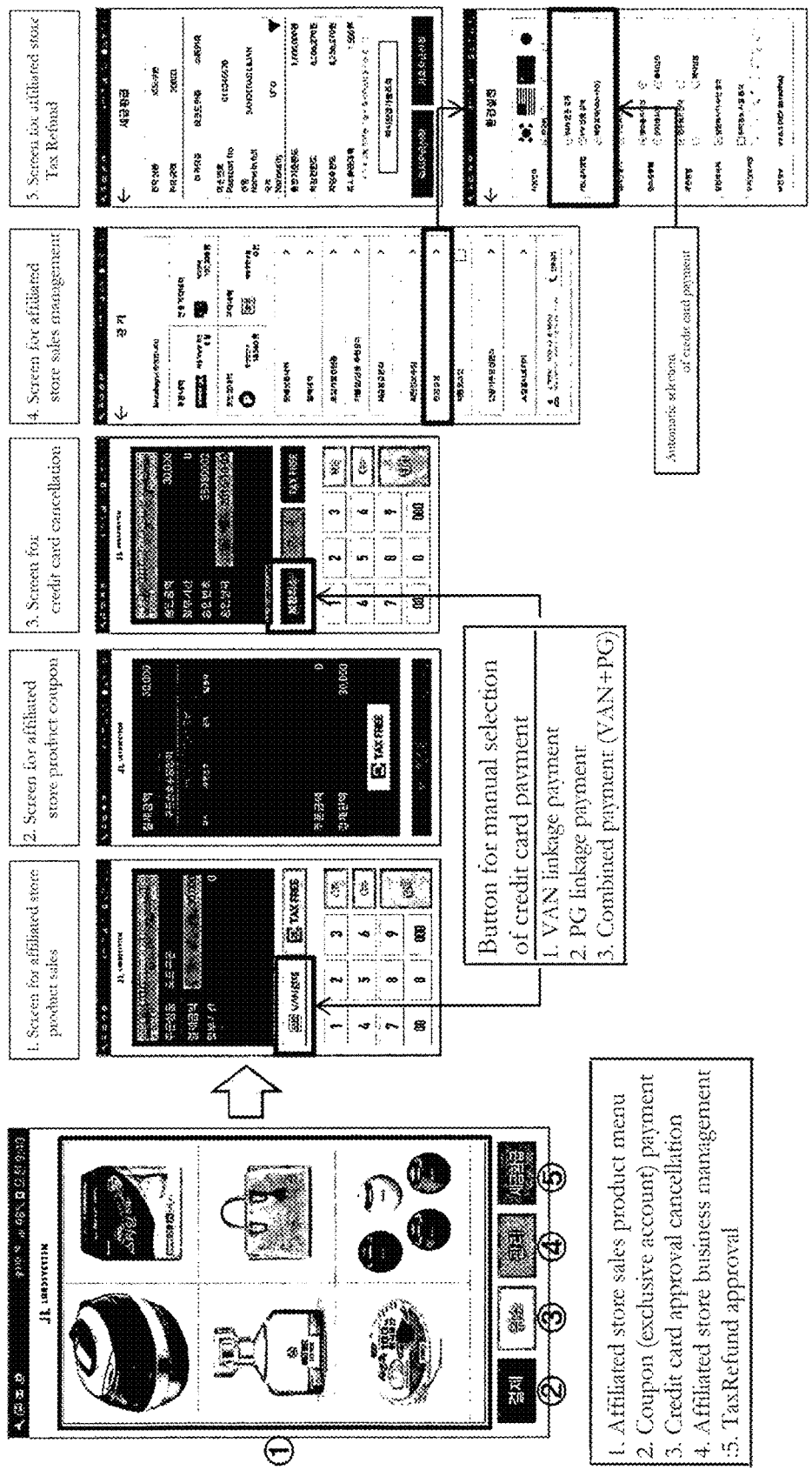
FIG. 3 is a view showing one embodiment of a screen displayed on the intelligent terminal according to FIG. 2.

Meanwhile, referring to FIG. 3, the intelligent terminal 100 displays a screen, which enables a VAN linkage or PG linkage payment processing to be performed, on the display 101 through the screen output unit 120, and the embodiment of the screen is shown.

As shown in the drawing, it shows the affiliated store product sales screen, coupon payment screen, credit card cancellation screen, affiliate store sales management screen, and affiliate store TAX REFUND screen.

In addition, in an affiliated store product sales screen and a credit card cancellation screen, the purchaser may select whether the payment is a payment through the VAN linkage, a payment through the PG linkage, or a combined payment processed by selectively switching the VAN linkage or the PG linkage as needed.

An initial payment processing setting may be selectively changed through the affiliated store sales management screen.

Figure 5:
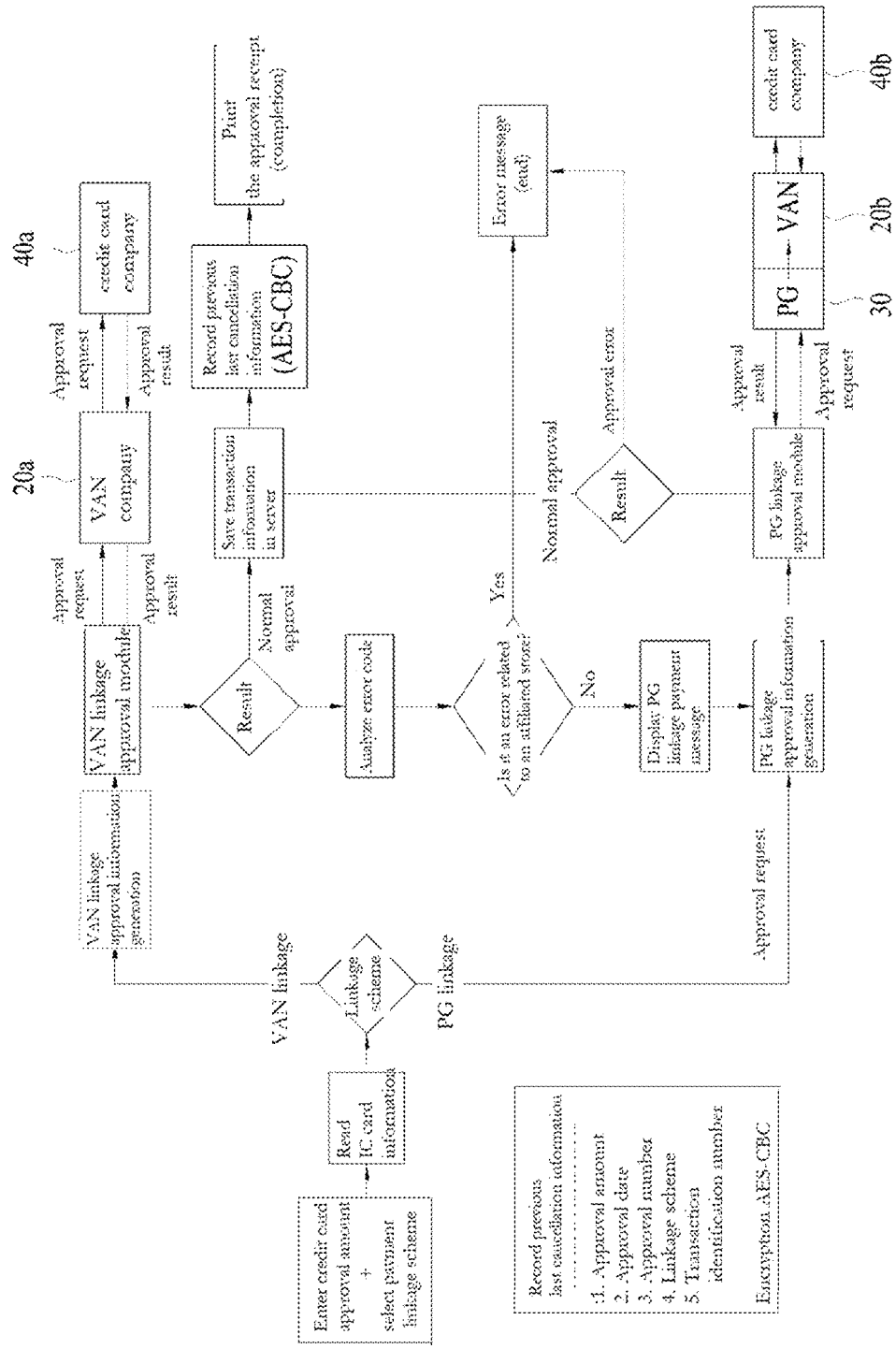
FIG. 5 is a diagram showing a flow of processing a credit card payment according to FIG. 4.

Then, one embodiment of a payment processing according to the payment processing method using the intelligent credit card payment system 1 will be as follows with reference to FIG. 5.

The payment processing method using the intelligent credit card payment system according to the present invention has a flow as follows.

First, the method includes: step S1 of checking transaction information including card information, product price, and payment information from an IC credit card of a purchaser, and selecting a VAN linkage or a PG linkage according to a setting; step S2 of generating VAN approval information according to the VAN linkage in step S1 and requesting an approval using a VAN network; step S3 of checking whether the approval is normally performed or rejected based on the approval request in step S2; step S4 of storing the transaction information and outputting a receipt when the result in step S3 is the normal approval, thereby completing the transaction; step S5 of analyzing an error code when the result in step S3 is the rejected approval; step S6 of displaying that a payment is switched to be processed through the PG linkage when an error is confirmed as being related to the affiliate store according to step S5, and requesting an approval using a PG network by converting the VAN payment information to the PG payment information; step S7 of checking whether the approval is normally performed or rejected based on the approval request in step S6; step S8 of storing the transaction information and outputting a receipt when the result in step S7 is the normal approval, thereby completing the transaction; step S8 of determining that the result is an error related to the purchaser and terminating the transaction when the result in step S7 is the rejected approval.

Figure 6:
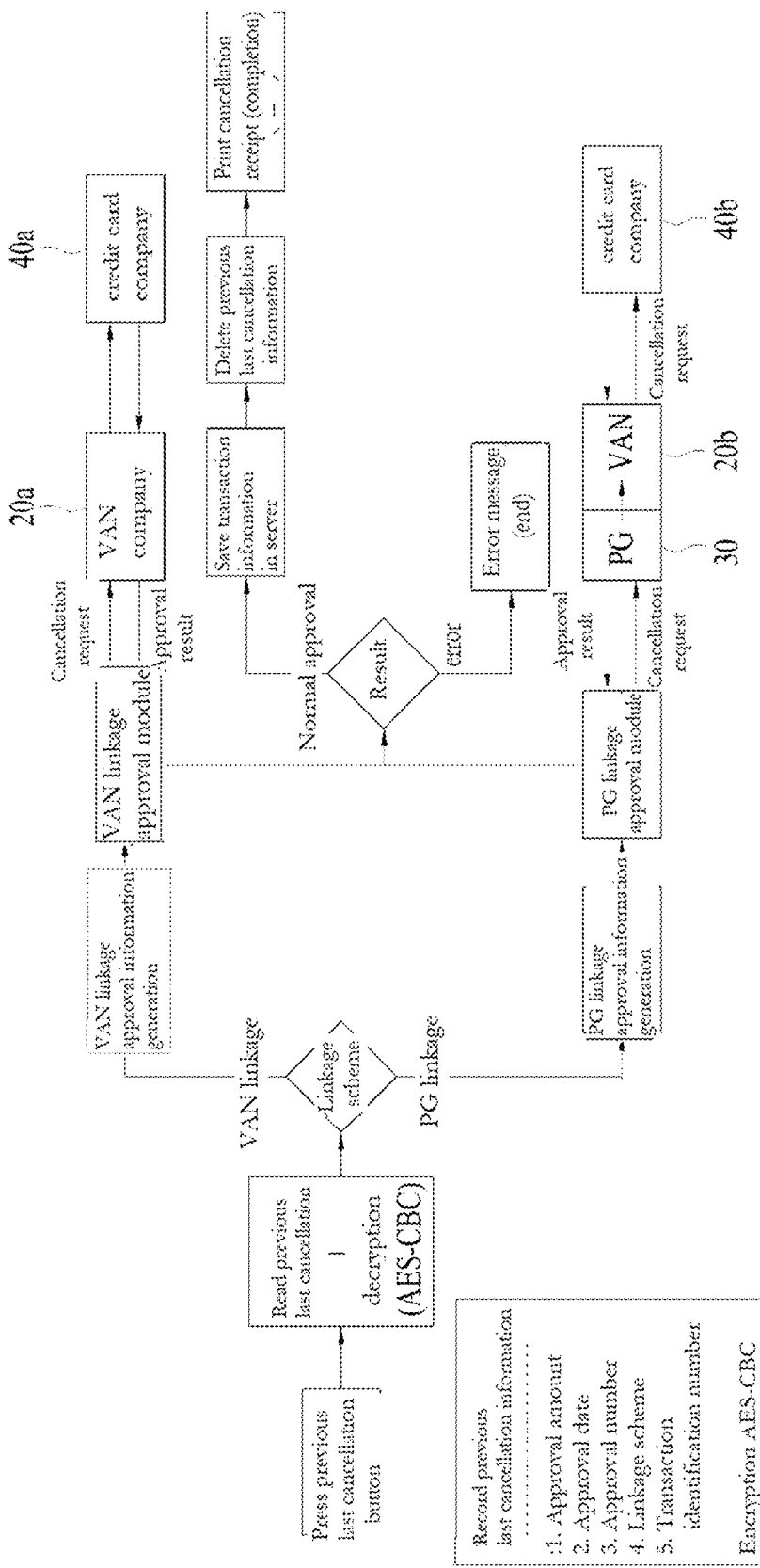
FIGS. 6 and 7 are diagrams showing a flow of cancellation processed upon request for transaction cancellation by a purchaser according to FIG. 5.

Meanwhile, step S4 and step S8 include step SS1 of confirming a final purchase intention of the purchaser just before completing the transaction. Referring to FIG. 6, in step SS1, VAN approval information or PG approval information according to a cancellation request is generated to request a cancellation approval by using the VAN network or the PG network, and the transaction information canceled upon the normal approval is stored in the server 200 according to the result of the cancellation approval request, and temporarily stored transaction information is deleted.

Figure 7:
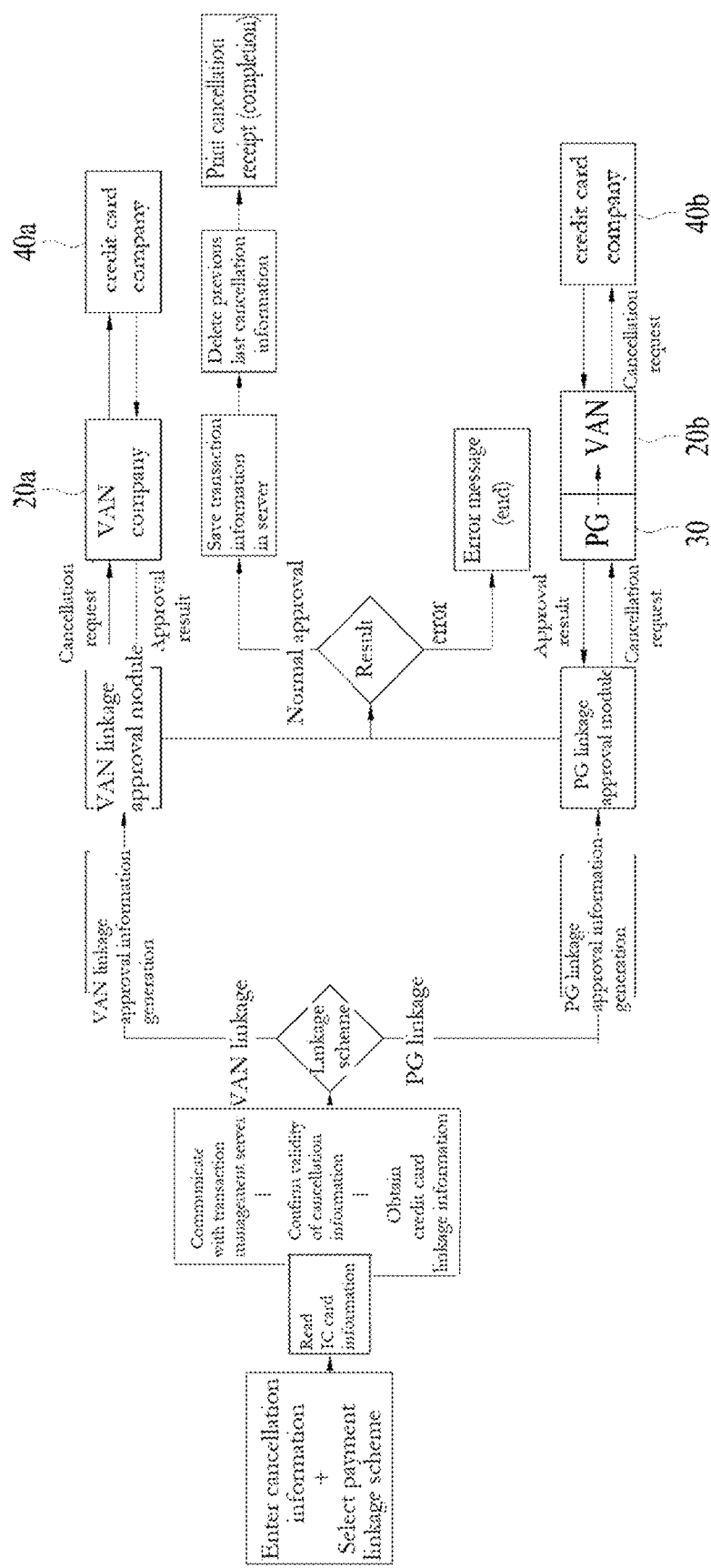

In addition, step S4 and step S8 include transaction cancellation step S9 subject to a purchase cancellation request by the purchaser after completing the transaction. FIG. 7 shows a flow as follows.

The transaction cancellation step S9 includes: process S91 of checking cancellation information including card information, product price, and payment information from the IC credit card of the purchaser; process S92 of comparing and checking the cancellation information in process S91 with the transaction information stored in the server 200 and confirming whether the payment is processed through the VAN linkage or the PG linkage; and A step in which VAN approval information or PG approval information subject to a cancellation request is generated according to the payment processing confirmed in S92 process to request a cancellation approval by using the VAN network or the PG network, and the transaction information canceled according to the result of the cancellation approval request is stored in the server 200, and the temporarily stored transaction information is deleted.

It shall be apparent to those skilled in the art that the present invention is not limited to the described embodiments and accompanying drawings, and various replacements, deformations and modifications are available without departing from the spirit or scope of the invention as defined in the appended claims.

As described above, according to the intelligent credit card payment system and the payment processing method of the present invention, the credit card payment is performed by automatically routing the VAN linkage and the PG linkage as necessary upon payment using the IC credit card, so that the security and the convenience can be improved. The affiliated store is not limited by the affiliated credit limit due to the duplex payment structure through the VAN or PG linkage, so that the payment can stably proceed without being interrupted.

The invention claimed is:

1. An intelligent credit card payment system comprising:
an intelligent terminal of an affiliated store that inputs transaction information including card information, product price, and payment information according to an IC credit card payment of a purchaser, and automatically sets and performs a payment processing network through VAN linkage or PG linkage;

a VAN network for processing the transaction information inputted according to the VAN linkage of the intelligent terminal by encrypting the transaction information to VAN approval information; and a PG network processing the transaction information inputted according to the PG linkage of the intelligent terminal by encrypting the transaction information to PG approval information, wherein:
the intelligent terminal is provided with a duplex payment structure configured according to setting of the intelligent terminal in which the intelligent terminal is automatically routed upon approval rejection due to an error relevant to the affiliated store during processing a payment subject to the VAN linkage and displays a switching to a payment processing through the PG linkage, and the VAN approval information is converted to the PG approval information, so that a payment processing subject to the VAN linkage is switched to a payment processing subject to the PG linkage, and wherein the intelligent terminal is further configured to:
provide a commission to a PG company as a representative makes a contract with a credit card company for using the PG linkage provided by the PG company;

directly connect to the credit card company by using the VAN linkage; and select a payment through the VAN linkage, a payment through the PG linkage, or a combined payment processed by selectively switching the VAN linkage or the PG linkage in an affiliated store product sales screen and a credit card cancellation screen outputted on a display of the intelligent terminal.

2. The intelligent credit card payment system of claim 1, wherein the intelligent terminal comprises at least one of:
a card reader unit for reading the credit card of the purchaser to input the transaction information;
a control unit having:
  a credit card payment linkage routing module for selecting a payment network subject to the VAN linkage or the PG linkage according to the inputted transaction information and the setting,
  a VAN linkage approval information generation module for encrypting and generating approval information when VAN is linked,
  a PG linkage approval information generation module for encrypting and generating approval information when PG is linked, and
  a response message analysis approval routing module for determining whether to set up PG linkage by analyzing a rejection reason when the VAN linkage approval information is rejected;
a communication processing unit having:
  a VAN linkage approval module,
  a PG linkage approval module, and
  a communication module for storing completed transaction information in a DB server through a communication network; and
a memory unit having a last previous credit card approval transaction storage module in which transaction information before transaction completion approval is encrypted and temporarily stored.

* * * * *